Feb. 9, 1954 E. W. CARLSEN 2,668,648
BAG FILLING DEVICE WITH VALVED PIVOTALLY MOUNTED CHUTE
Filed Sept. 15, 1950 2 Sheets-Sheet 1
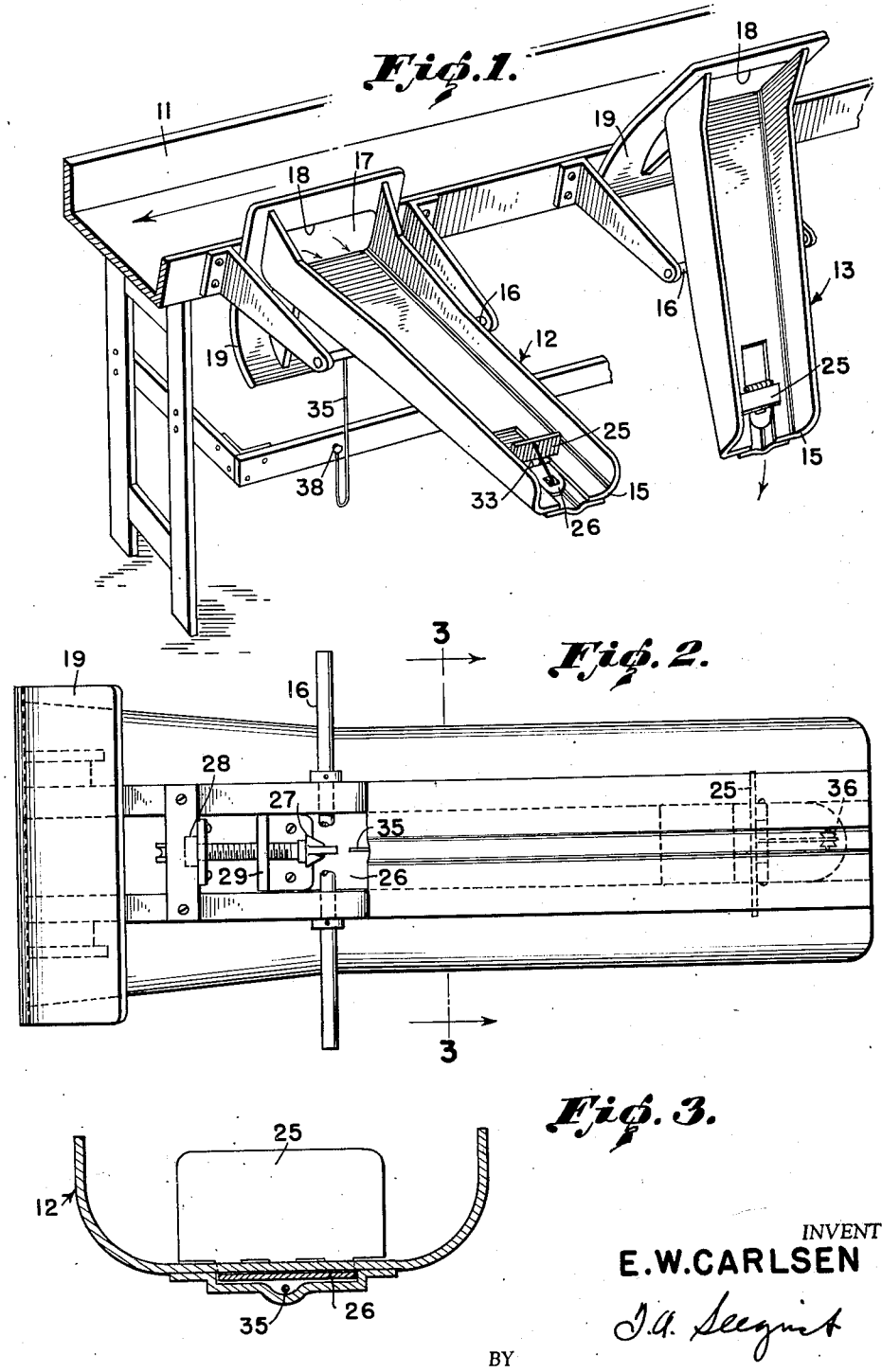
INVENTOR
E. W. CARLSEN
BY
ATTORNEY Feb. 9, 1954          E. W. CARLSEN          2,668,648
BAG FILLING DEVICE WITH VALVED PIVOTALLY MOUNTED CHUTE
Filed Sept. 15, 1950          2 Sheets-Sheet 2
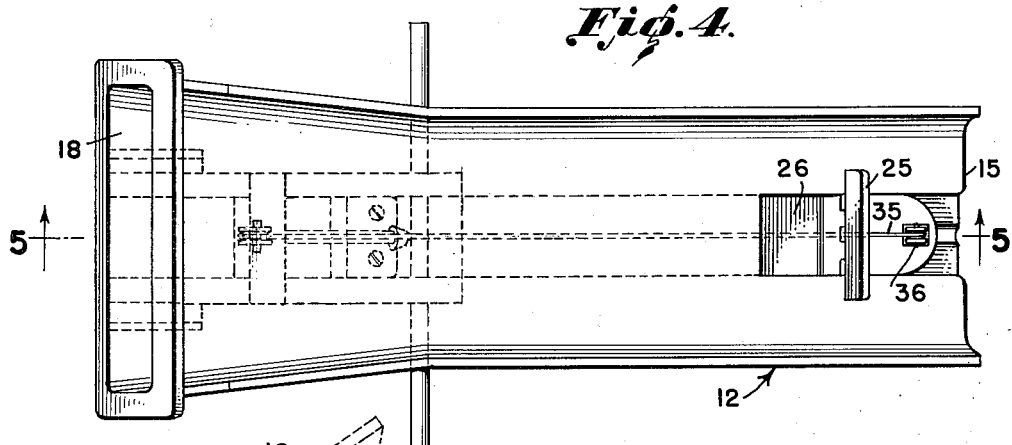
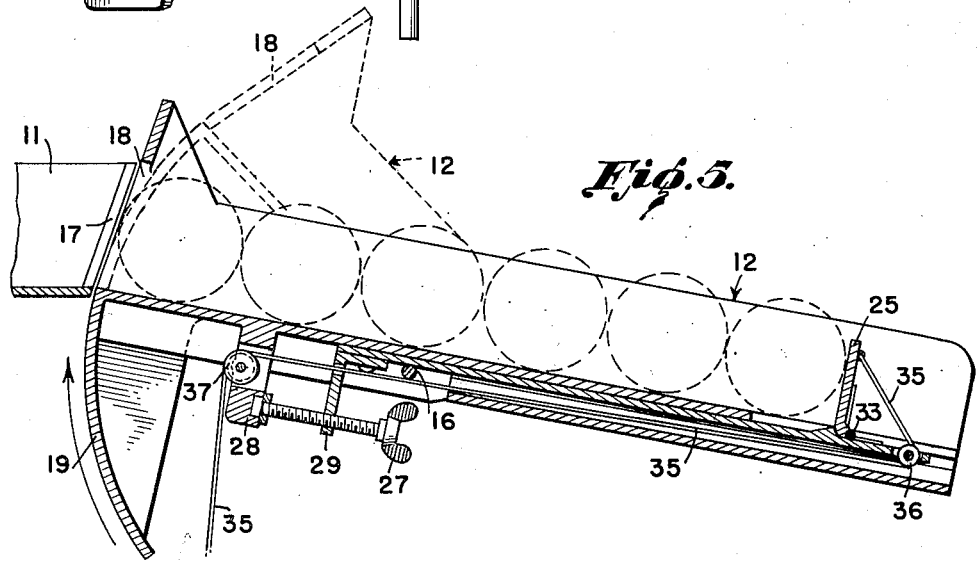
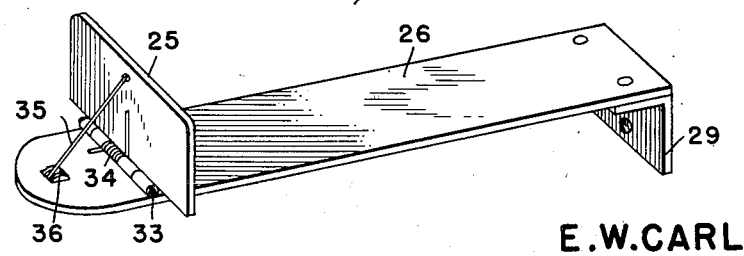
INVENTOR
E.W.CARLSEN
BY
ATTORNEY Patented Feb. 9, 1954

2,668,648

UNITED STATES PATENT OFFICE 2,668,648

BAG-FILLING DEVICE WITH VALVED PIVOTALLY MOUNTED CHUTE

Earl W. Carlsen, Yakima, Wash., dedicated to the free use of the People in the territory of the United States Application September 15, 1950, Serial No. 185,708

1 Claim. (Cl. 226—18)

I hereby dedicate the invention herein described to the free use of the People in the territory of the United States to take effect on the granting of a patent to me.

This invention relates to a device for filling bags with a fruit or vegetable produce, such as apples, and has among its objects the provision of a structure which is simple to operate and speedy, thus to reduce labor costs in the produce-packing industries.

In general, according to the invention, an open chute is provided. The chute has a free end and is so shaped that an operator may slip over the chute an open bag to be filled with the produce. The chute is, preferably, pivotally mounted near a side wall of a trough or container having a wall opening therethrough such that the chute-loading end of the chute opposite the free end moves past the wall opening as the chute is pivoted from a nearly horizontal chute-loading position to a tilted bag-filling position. In the chute-loading position, a chute opening in the chute-loading end registers with the wall opening. This permits passage of the produce through the two openings to load the produce from the trough or container into the chute. A gate is carried by the chute-filling end to register with the wall opening when the chute is moved to its bag-filling position, thus to close the wall opening and stop passage of the produce from the container during removal of the filled bag from the chute.

A stop is preferably pivotally mounted in the chute near its open end and is spring urged to a position projecting into the chute for limiting the quantity of produce loaded in the chute and for holding the produce loaded therein, the produce engaging the stop while the chute is in the loading position. Means is provided for automatically moving the stop to a position of disengagement with the produce when the chute is moved to the bag-filling position to release the produce and permit it to slide from the chute in the bag as the bag is removed from its position on the chute. The stop is located within the chute in both its produce-engaging and produce-disengaging positions so as not to interfere with the bag.

For a detail description of the invention, reference is made to the accompanying drawing, in which:

Figure 1 is a three-dimensional view showing two units of the device, one in the chute-loading position and one in the bag-filling position;

Figure 2 is a bottom view of a chute;

Figure 3 is a section on line 3—3 of Figure 2;

Figure 4 is a top view of the chute;

Figure 5 is a section on line 5—5 of Figure 4; and

Figure 6 is a three-dimensional view of a detail.

Apples, or other fruit or vegetable produce to be packaged, are fed to the individual units from a suitably supported trough 11, any desired number of units being associated with the trough. Two similar units 12, in its chute-loading position, and 13, in its bag-filling position, are shown in Figure 1.

Each unit provides an open, free end chute 15 over which the operator slips the bag, such as a transparent, flexible display bag, to be filled. The chute is pivotally supported as at 16 near the trough with the chute-filling end opposite the free end, moving past a wall opening 17 in a side wall of the trough as the chute is pivoted from a nearly horizontal chute-loading position to a tilted, bag-filling position. In the chute-loading position, a chute opening 18 in the chute-filling end registers with wall opening 17 so that the produce may pass from the trough through the two openings to load the chute. In the bag-filling position, a gate, such as a skirt 19 carried by the chute-filling end, registers with opening 17 thus to close it.

Means is provided for limiting the number of apples or other units of produce loaded in the chute to a predetermined quantity and for holding the produce loaded therein. This is accomplished by a stop 25 adjustably mounted near the open end of the chute, as by being attached to a plate 26 mounted on the chute to slide longitudinally thereof and adjusted by a thumb screw 27 mounted to rotate but not to translate in a lug 28 fixed to the chute and threadedly engaging a lug 29 fixed to the plate. When used to fill bags with apples well graded as to size, the stop can be adjusted to allow only a predetermined number of apples to be loaded in the chute.

Means is also provided for automatically moving the stop 25 when the chute is moved to the bag-filling position, thus to release the produce and permit it to slide from the chute in the bag as the bag is removed from its position on the chute. This is accomplished by pivotally mounting the stop 25 as at 33, a spring 34 being provided to hold the stop in its produce-holding position. A flexible cord 35 is fastened at one end to the stop, threaded over pulleys 36 and 37 carried by the chute, and is fastened stationary at the other end as at 38, the arrangement, as shown, being such that as the chute moves to the bag-filling position, the cord tightens and pivots the stop against the tension of the spring to lie flat on the bottom of the chute, and as the chute returns to its chute-loading position, the cord slackens, permitting the spring to return the stop to its produce-holding position.

I claim:

A bag-filling device comprising an open chute having a free end and so shaped that an operator may slip over the chute an open bag to be filled with a fruit or vegetable produce, a side wall having an opening therethrough, said chute being pivotally supported near the wall with its chute-filling end opposite the free end moving past the wall opening as the chute is pivoted from a nearly horizontal chute-loading position to a tilted bag-filling position, a chute opening in the chute-filling end registering with the side wall opening when the chute is in its chute-loading position for passage of the produce through the openings to load the chute, a gate carried by the chute-filling end which registers with the wall opening to close it when the chute is in the bag-filling position, a stop pivotally mounted within the chute near its open free end and spring urged to a position projecting into the chute against which the produce engages while the chute is in the chute-loading position for limiting the quantity of produce loaded in the chute, and means for automatically moving the stop to a position of disengagement with the produce when the chute is moved to the bag-filling position, thus to release the produce and permit it to slide from the chute in the bag as the bag is removed from its position on the chute, said free end of the chute remaining free when the chute is in its bag-filling position so as to permit removal of the bag therefrom, and said stop being within the chute in both its produce-engaging and produce-disengaging positions so as not to interfere with the bag.

EARL W. CARLSEN.

References Cited in the file of this patent

UNITED STATES PATENTS

| Number | Name | Date |
| --- | --- | --- |
| 928,022 | Boland et al. | July 13, 1909 |
| 1,090,855 | Jagenberg | Mar. 24, 1914 |
| 1,647,356 | Hendry | Nov. 1, 1927 |
| 1,657,761 | Novelli | Jan. 31, 1928 |
| 2,510,541 | Beeson | June 6, 1950 |
| 2,523,562 | Eakin et al. | Sept. 26, 1950 |